US009510377B2

(12) United States Patent
Jin

(10) Patent No.: US 9,510,377 B2
(45) Date of Patent: Nov. 29, 2016

(54) METHOD AND APPARATUS FOR MANAGING SESSION BASED ON GENERAL PACKET RADIO SERVICE TUNNELING PROTOCOL NETWORK

(71) Applicant: WINS Co., Ltd., Gyeonggi-do (KR)

(72) Inventor: Yong Sig Jin, Gyeonggi-do (KR)

(73) Assignee: WINS Co., Ltd., Gyeonggi-do (KR)

( * ) Notice: Subject to any disclaimer, the term of this patent is extended or adjusted under 35 U.S.C. 154(b) by 0 days.

(21) Appl. No.: 14/682,965

(22) Filed: Apr. 9, 2015

(65) Prior Publication Data
US 2015/0296549 A1 Oct. 15, 2015

(30) Foreign Application Priority Data

Apr. 9, 2014 (KR) .................. 10-2014-0042256

(51) Int. Cl.
H04W 76/02 (2009.01)
H04L 12/46 (2006.01)
H04L 29/06 (2006.01)
H04W 12/00 (2009.01)
H04W 76/04 (2009.01)

(52) U.S. Cl.
CPC ........ *H04W 76/022* (2013.01); *H04L 12/4633* (2013.01); *H04L 63/029* (2013.01); *H04L 63/1441* (2013.01); *H04L 65/1069* (2013.01); *H04W 12/00* (2013.01); *H04W 76/021* (2013.01); *H04W 76/041* (2013.01)

(58) Field of Classification Search
CPC ........... H04W 76/022; H04W 76/021; H04W 60/04; H04W 72/0406; H04W 24/08; H04W 12/06; H04W 8/12; H04W 8/02; H04W 80/04; H04W 76/04; H04W 12/12; H04W 76/041; H04W 12/00; H04L 12/4633; H04L 65/1069; H04L 45/745; H04L 63/0892; H04L 45/16; H04L 45/54; H04L 43/028; H04L 63/1441; H04L 43/12; H04L 63/029

USPC .............. 370/241, 326, 331, 252, 328, 242; 455/410, 411
See application file for complete search history.

(56) References Cited

U.S. PATENT DOCUMENTS 8,855,071 B1* 10/2014 Sankaran ............ H04W 76/021
370/329
2003/0081607 A1* 5/2003 Kavanagh ........... H04L 63/0227
370/392

(Continued)

FOREIGN PATENT DOCUMENTS

JP 2013-005415 A 1/2013
KR 10-2003-0054814 A 7/2003

*Primary Examiner* — Edan Orgad
*Assistant Examiner* — Ivan O Latorre
(74) *Attorney, Agent, or Firm* — The PL Law Group, PLLC

(57) ABSTRACT

The present invention includes creating a session in response to a session setup request for a general packet radio service (GPRS) application service, receiving GTP packet data using GPRS tunneling protocol (GTP) tunnel, performing decoding on the GTP packet data, determining whether there is an attack attributable to malicious behavior based on a predetermined management DB, identifying the type of the GTP packet data as the type of GTP packet for attacked GTP packet data and the type of GTP packet for non-attacked packet data based on a result of the determination, carrying out a predetermined policy for the identified type of GTP packet, performing the standardization of the packet data of each GTP version, determining whether the standardized packet data has been registered with a hash buffer in accordance with the type of pairing message for each command, and processing a session based on a result of the determination.

11 Claims, 6 Drawing Sheets

(56) References Cited

U.S. PATENT DOCUMENTS

| | | | | |
|---|---|---|---|---|
| 2004/0047308 A1* | 3/2004 | Kavanagh | H04W 12/10 | 370/328 |
| 2004/0179504 A1* | 9/2004 | Kim | H04W 24/00 | 370/338 |
| 2007/0287417 A1* | 12/2007 | Abramovich | H04L 63/0272 | 455/410 |
| 2009/0088147 A1* | 4/2009 | Bu | H04L 63/1416 | 455/423 |
| 2012/0076120 A1* | 3/2012 | Kovvali | H04W 76/021 | 370/338 |
| 2012/0329428 A1* | 12/2012 | Hasegawa | H04W 12/06 | 455/411 |
| 2013/0148510 A1* | 6/2013 | Kang | H04L 63/1441 | 370/242 |
| 2013/0272136 A1* | 10/2013 | Ali | H04W 24/08 | 370/241 |
| 2014/0098687 A1* | 4/2014 | Anthony, Jr. | H04W 36/0033 | 370/252 |
| 2014/0105060 A1* | 4/2014 | Baillargeon | H04W 8/24 | 370/253 |
| 2014/0328204 A1* | 11/2014 | Klotsche | H04L 43/028 | 370/252 |
| 2015/0215841 A1* | 7/2015 | Hsu | H04L 43/12 | 370/328 |

* cited by examiner

METHOD AND APPARATUS FOR MANAGING SESSION BASED ON GENERAL PACKET RADIO SERVICE TUNNELING PROTOCOL NETWORK

CROSS-REFERENCE TO RELATED APPLICATION

This application claims the priority based on Korean Application No. 10-2014-0042256 filed Apr. 9, 2014, which is incorporated herein by reference.

BACKGROUND

1. Technical Field

The present invention relates to the management of a general packet radio service (GPRS) tunneling protocol (GTP) session in a network environment in which a GTP is used.

2. Description of the Related Art

User equipment (UE) is dynamically assigned IP addresses via a PDN gateway (P-GW), connects to an external Internet and then operates. In this case, IP packets are transmitted through a GTP tunnel.

When UE initially accesses an LTE network, a GTP tunnel is set up for each EPS bearer through control signaling. After a session has been created, an existing system in transparent mode has a limitation on checking the target of a GTP attack and performing control with respect to the GTP attack because data and signaling information are transferred through the GTP tunnel based on only a unique TEID.

Accordingly, there is a need for a system that is capable of flexibly processing traffic and supporting the management of a session in a single session management system.

SUMMARY

At least one embodiment of the present invention is directed to managing a GTP session in a network environment in which a GTP is used and performing session-based control with respect to an IP attack in a GTP network section.

In accordance with an aspect of the present invention, there is provided a method of managing a session based on a general packet radio service (GPRS) tunneling protocol (GTP) network, the method including monitoring a tunnel creation request message transmitted between a serving gateway (S-GW) and a PDN gateway (P-GW) in order to create a GTP tunnel; extracting information about user equipment (UE) for the registration of a session from the tunnel creation request packet, and registering the extracted information with a hash buffer; monitoring, by the P-GW, a tunnel creation response message transmitted to the S-GW in response to the received tunnel creation request message; creating the GTP tunnel based on the information about the UE in response to the tunnel creation response message received by the S-GW; and creating a session chain based on a GTP packet transmitted through the created GTP tunnel.

In accordance with another aspect of the present invention, there is provided an apparatus for managing a session based on a general packet radio service (GPRS) tunneling protocol (GTP) network, the apparatus including a control unit configured to monitor a tunnel creation request message transmitted between a serving gateway (S-GW) and a PDN gateway (P-GW) in order to create a GTP tunnel, to extract information about user equipment (UE) for the registration of a session from the tunnel creation request packet, to register the extracted information with a hash buffer, and to create the GTP tunnel based on the information about the UE in response to a tunnel creation response message received by the S-GW when the tunnel creation response message is transmitted to the S-GW in response to the received tunnel creation request message; and a session management unit configured to form a session chain based on a GTP packet transmitted through the created GTP tunnel under a control of the control unit.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Embodiments of the present invention are described in detail with reference to the accompanying drawings below. Although specific details, such as specific components, are illustrated in the following description, they are provided merely to help a general understanding of the present invention. It will be apparent to those skilled in the art that various modifications and variations can be made within the scope of the present invention.

At least one embodiment of the present invention relates to the management of a GTP session in a network environment in which a GTP is used. More particularly, at least one embodiment of the present invention provides a technology for managing a GTP session by managing the GTP session in a GTP network which provides packet data communication through a tunnel, analyzing whether packet data transferred through a created GTP tunnel has been attacked after a session for setting up a GTP data call transmitted between a Long Term Evolution (LTE) network S-GW and an LTE network P-GW in order to control an attack in a lower session of UE has been connected, and blocking an IP based on a result of the determination or generating extracted user equipment (UE)-related information for a session chain and managing the session chain as a single session.

Furthermore, the UE according to an embodiment of the present invention may be a terminal capable of data communication with a server over a network. It will be apparent that the UE may be applied to all the information communication devices and multimedia devices, such as digital broadcast terminals, personal digital assistants (PDA), smart phones, 3G terminals, for example, International Mobile Telecommunication 2000 (IMT-2000) terminals, wideband code division multiple access (WCDMA) terminals, global systems for mobile communication packet radio service (GSM/GPRS) and universal mobile telecommunication service (UMTS) terminals, and the applications thereof.

A method of managing a session based on a GTP network according to an embodiment of the present invention is described in detail with reference to FIGS. 1 to 6 below.

Figure 1:
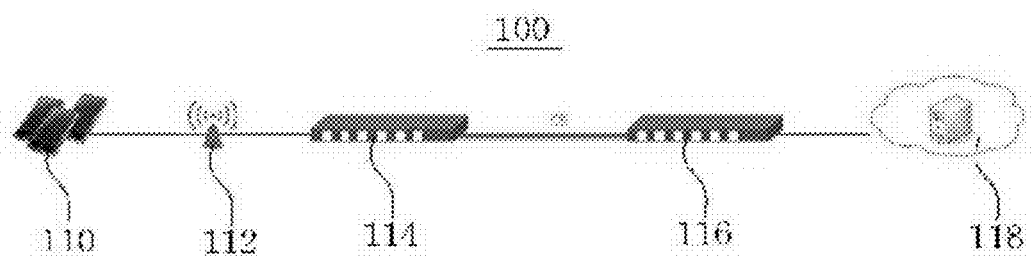
FIG. 1 is a diagram of the schematic configuration of an overall system to which a method of managing a session based on a GTP network according to an embodiment of the present invention has been applied.

First, FIG. 1 is a diagram of the schematic configuration of an overall system to which a method of managing a session based on a GTP network according to an embodiment of the present invention has been applied.

Referring to FIG. 1, an LTE network system 100 to which the present embodiment has been applied includes UE 110 configured to be capable of data communication, an evolved node B (eNB) 112, that is, an LTE base station, configured to enable wireless connection between the UE 110 and an LTE network, an S-GW 114 configured to perform a handover function, a P-GW 116 configured to connect the UE 110 to an external network, and an external service server 118 configured to provide packet filtering.

In this case, the eNB 112 and the S-GW 114 operate in conjunction with each other over a network set by an operator, and the network is a network managed by the operator.

In the method of managing a session based on a GTP network according to the present embodiment, the general system 100 of FIG. 1 performs session-based control on traffic between the S-GW 114 and the P-GW 116, monitored in transparent mode, with respect to an IP attack. The method is described in greater detail with reference to FIG. 2.

Figure 2:
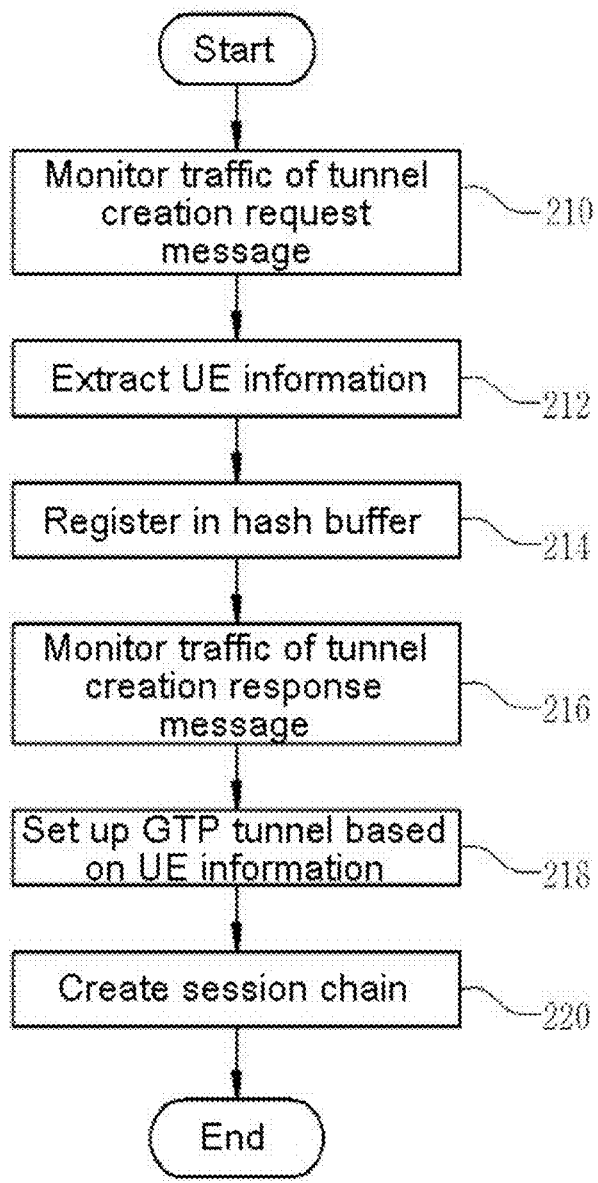
FIG. 2 is an overall flowchart illustrating a method of managing a session based on a GTP network according to an embodiment of the present invention.

FIG. 2 is an overall flowchart illustrating a method of managing a session based on a GTP network according to an embodiment of the present invention.

Referring to FIG. 2, first, in operation 210, a tunnel creation request message transmitted between the S-GW and the P-GW in transparent mode in order to create a GTP tunnel according to a GPRS application service is monitored.

In operation 212, information about UE for the registration of a session is extracted from the tunnel creation request packet. In operation 214, the information about UE is registered with a hash buffer.

The GTP is an application protocol that operates above a user datagram protocol (UDP). The GTP is a protocol that generates packet data including a GTP heater and performs the exchange of data between networks through a setup tunnel. The tunnel creation request message is used to set up a GTP data call transmitted between the S-GW and P-GW of the LTE network. Packets used to set up a data call for each network include a tunnel creation request message, a tunnel creation response message, a tunnel update request message, a tunnel update response message, a tunnel deletion request message, and a tunnel deletion response message.

In operation 216, the P-GW monitors a tunnel creation response message transmitted to the S-GW in response to the received tunnel creation request message. As a result of the monitoring, in operation 218, a GTP tunnel based on the information about the UE is created in response to the tunnel creation response message received by the S-GW.

Thereafter, in operation 220, a session chain based on GTP packets that are transmitted through the created GTP tunnel is created.

In this case, in order to create the GTP tunnel, a tunnel creation request message is transmitted between the S-GW and the P-GW.

The tunnel creation request message includes a mobile subscriber ISDN number (MSISDN) and a sequence number that are required to create the GTP tunnel. In this case, the MSISDN is the telephone number of the UE, and the sequence number is a number used for matching between the request message and the response message.

When the tunnel creation response message is transmitted from the P-GW to the S-GW, the GTP tunnel is created based on the information about the UE. The tunnel creation response message is transmitted to the S-GW. The tunnel creation response message includes an IP address and a TEID (i.e., an identifier that is used by the UE when the UE sends packet data) that will be used by the UE.

When the tunnel creation response message is transmitted from the S-GW to the P-GW, the GTP tunnel is created based on the UE information, an environment is configured so that packet data is transmitted and received through the GTP tunnel. The packet data may be transmitted between the UE and an external network through the created GTP tunnel.

Furthermore, in order to update the GTP tunnel through which the packet data is transmitted and received, a tunnel update request message is transmitted from the S-GW to the P-GW. When the tunnel update request message is received from the S-GW, the P-GW sends a tunnel update response message to the S-GW. When the GTP tunnel is updated, the TEID that is used by the UE when the UE sends packet data is changed.

Thereafter, when the S-GW receives a tunnel deletion request message from the P-GW in order to delete the GTP tunnel after the transmission of the packet data has been terminated, the S-GW sends a tunnel deletion response message, and then the GTP tunnel is deleted.

Figure 3:
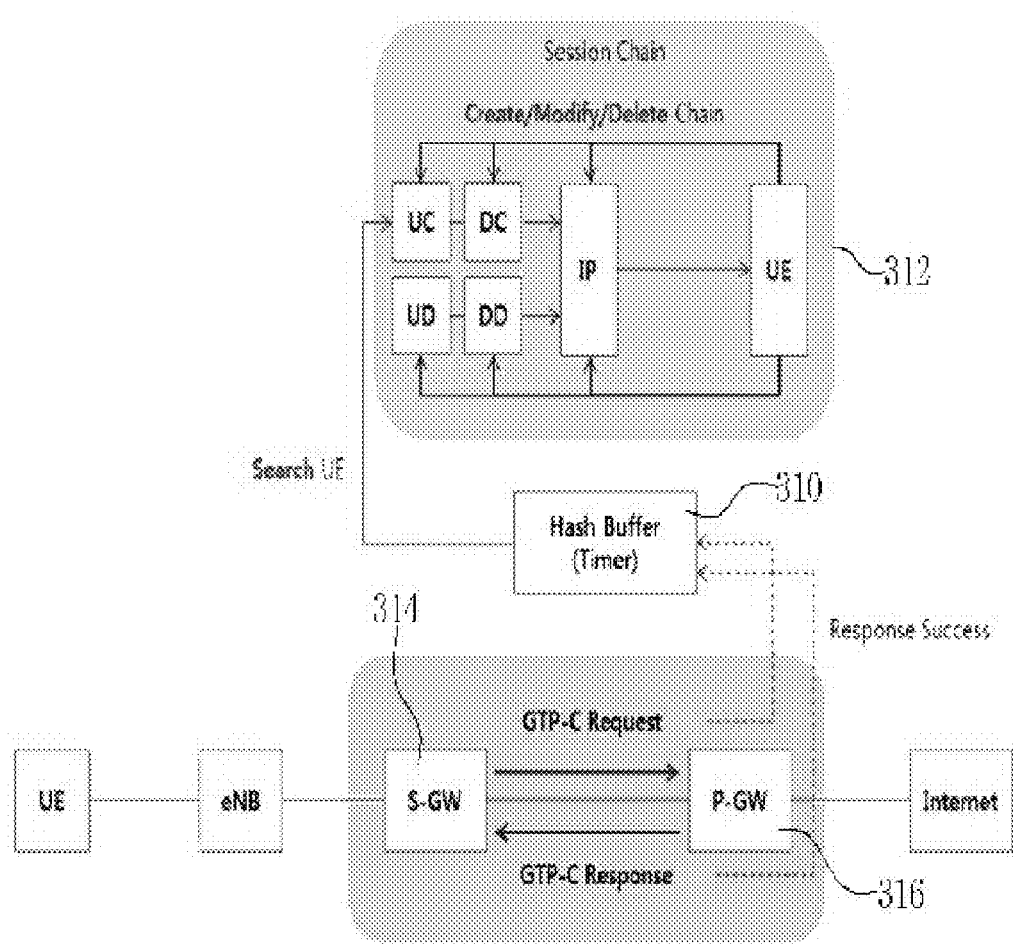
FIG. 3 is an exemplary diagram illustrating the flow of the management of an LTE network GTP session in the method of managing a session based on a GTP network according to an embodiment of the present invention.

In FIG. 3, a GTP-C request packet and a GTP-C response packet that pass through a GTP network between an S-GW 314 and a P-GW 316 in an LTE network may create or control a session chain 312 through a hash buffer 310.

In this case, the session chain is linked to an IP address at which uplink/downlink information is assigned to corresponding UE. The IP address is linked to information about the UE. The UE is linked to the uplink/downlink information and the IP address.

Furthermore, a tunnel modification or deletion request for the update or deletion of a session through a created GTP tunnel is stored in the hash buffer. If a response to the tunnel modification or deletion request is generated, an IP address is searched for by using the TEID information of a GTP heater, and UE is searched for based on a retrieved IP address.

When a command for the tunnel modification request is executed, the type of GTP packet received through the GTP tunnel is recognized. The IP address is searched for by using the TEID information included in uplink control (UC) or downlink control (DC) information in accordance with a policy predetermined in the recognized GTP-C packet. Information about a session chain linked to corresponding UE is modified.

When a command for the tunnel deletion request is performed, the type of GTP packet received through the GTP tunnel is recognized. The IP address is searched for by using the TEID information included in UC or DC information in accordance with a policy predetermined in a recognized GTP-C packet. The setup of a session chain linked to corresponding UE is released, and memory is reorganized.

Meanwhile, when a GTP-U packet is received, the P-GW inserts a GTP-U header having a TEID into the GTP-U packet and sends the GTP-U packet through the GTP tunnel.

The TEID is identified as a downlink TEID for the case where an inbound GTP packet is transmitted from the P-GW to the S-GW or an uplink TEID for the case where an outbound GTP packet is transmitted from the S-GW to the P-GW.

Figure 4:
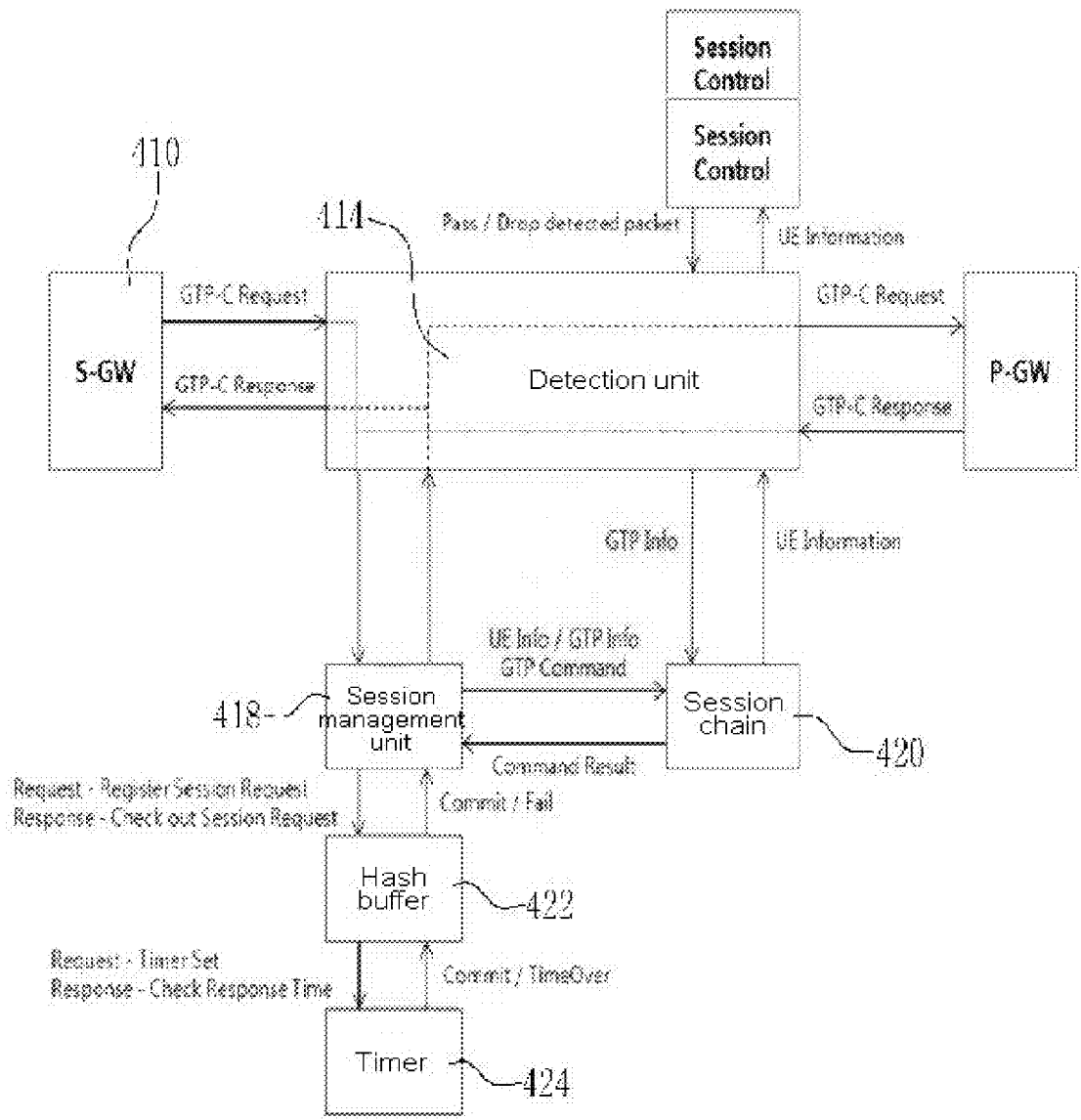
FIG. 4 is a schematic flowchart into which the flows of the operations illustrated in FIGS. 1 to 3 according to an embodiment of the present invention have been integrated and incorporated.

FIG. 4 is a schematic flowchart into which the flows of the operations illustrated in FIGS. 1 to 3 according to an embodiment of the present invention have been integrated and incorporated. Referring to FIG. 4, first, an S-GW 410 attaches a GTP heater to a packet transmitted from UE so that the packet is transmitted to a GTP network, and transfers a packet, transferred through a GTP tunnel, to the UE.

A detection unit 414 monitors, detects, and analyzes traffic in transparent mode in a GTP network section.

A GTP-C packet that belongs to packets that are not attack packets and that is related to the setup and control of a session is transferred to a session management unit 418.

If a received packet corresponds to a request, the session management unit 418 registers the received packet with a hash buffer 422. If the received packet corresponds to a response, the session management unit 418 searches the hash buffer 422 for a request. If GTP-C request/response conditions are satisfied, the session management unit 418 performs a corresponding command on a session chain 420.

In the case of a request packet, the session management unit 418 stores information, included in the request packet, in the hash buffer 422. In the case of a response packet, the session management unit 418 first checks whether a request is present in the hash buffer 422. If the request is found to be present, the session management unit 418 performs a GTP-C command on the session chain 420.

A timer 424 is set before the information included in the request packet is stored in the hash buffer 422. If a response is not received within a specific time, the content of a request stored in the hash buffer 422 are deleted. In the case of an arrived response, the timer 424 is checked. If a response time has been exceeded, a subsequent task is invalidated.

Information about UE, GTP information, and a command are received from the session management unit 418. A creation command carries the information about the UE. A session chain is created in the session chain 420 based on the information about the UE. In the case of a command for modification or deletion, UE within the session chain 420 is searched for based on a TEID included in the GTP information, and modification or deletion is performed.

The detection unit 414 may obtain information about UE by searching the session chain 420 for a corresponding session chain based on the GTP information of detected GTP data. The obtained information about the UE is transferred for session control, and is then used to pass or drop a packet destined for the corresponding UE.

Like the S-GW 410, a P-GW 412 attaches a GTP heater to a packet transmitted from UE so that the packet is transmitted to a GTP network and transfers a packed, transferred through a GTP tunnel, to the UE.

A schematic flowchart according to an embodiment of the present invention is described in greater detail with reference to FIG. 5.

Figure 5:
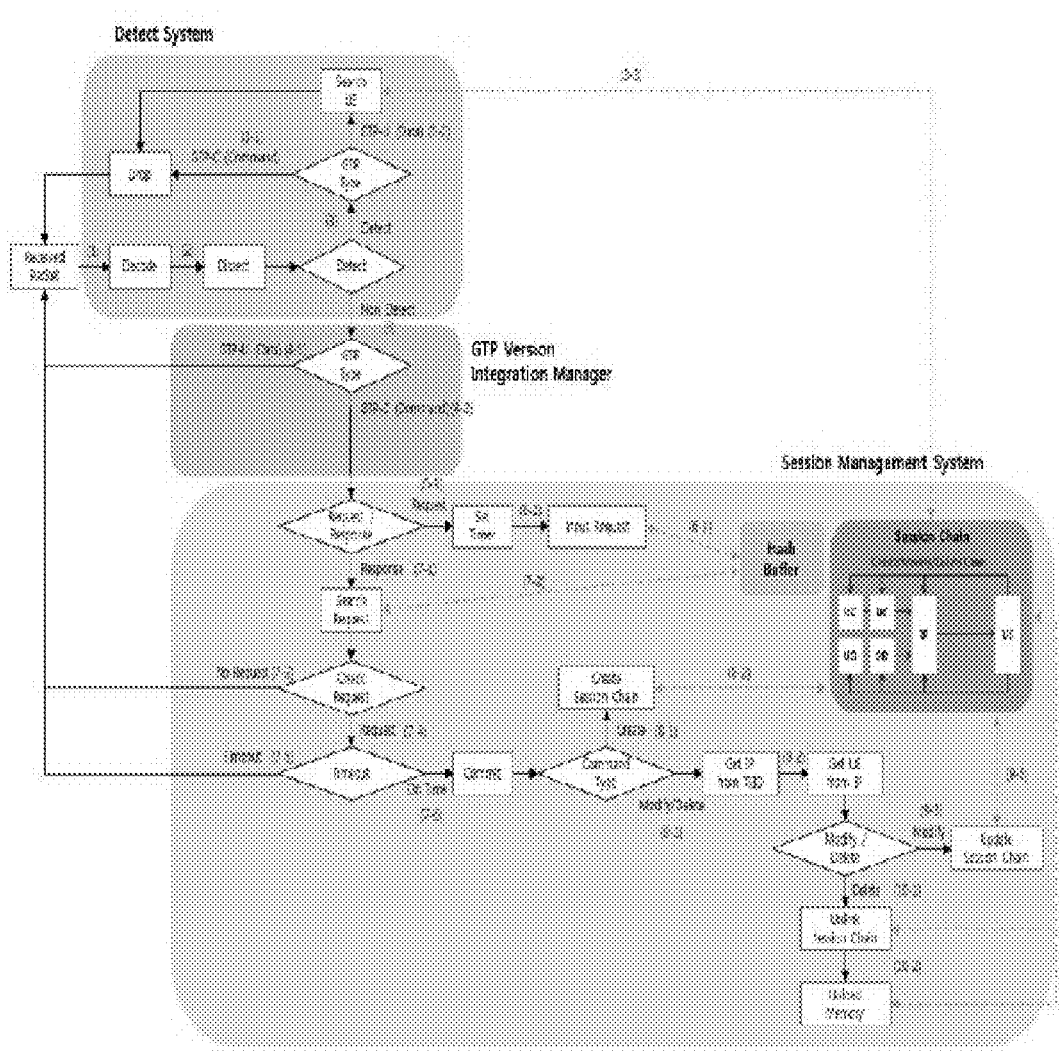
FIG. 5 is a detailed flowchart illustrating a method of managing a session based on a GTP network according to an embodiment of the present invention.

FIG. 5 is a detailed flowchart illustrating a method of managing a session based on a GTP network according to an embodiment of the present invention. Referring to FIG. 5, first, at step (1), a packet is read from a network interface card (NIC), and is then decoded for each GTP heater that includes a TEID assigned when a call is set up.

At step (2), a dissection engine analyzes whether the decoded packet has been attacked.

More specifically, the dissection engine determines whether GTP packet data received through the GTP tunnel has been attacked by malicious behavior by decoding the GTP packet data based on a predetermined management DB. Based on a result of the determination, an attacked GTP-C packet is blocked based on corresponding IP information. In the case of a GTP-U packet, information about UE is obtained by searching a registered session chain for the information about the UE based on GTP packet information.

The GTP-U packet that has not been attacked is controlled in accordance with information about the policy of a GTP network. Predetermined information is extracted from the attacked GTP-C packet, and is then generated as a subsequent session chain.

The policy of the GTP network refers to a policy that permits traffic without separate control if the traffic is normal traffic that has not been attacked.

Next, at step (3), whether the packet, for which whether an attack has been made has been detected, has a GTP-C or GTP-U format is determined. At step (3-1), the GTP-C packet is blocked based on corresponding IP information. At step (3-2), UE is searched for in the case of the GTP-U packet.

At step (3-3), information about the UE is obtained by searching a session chain, registered when a session is created, for the UE based on information about the GTP of the GTP-U packet.

Meanwhile, whether a packet, for which an attack has not been detected as a result of the analysis of whether the decoded packet has been attacked at step (2), has a GTP-C or GTP-U format is determined at step (4). At step (4-1), the GTP-U packet is not used in a session management system. At step (4-2), the GTP-C packet is used in a session management system.

At steps (5) and (6), whether a packet corresponds to a request or a response is determined. When a request packet is received at step (6-1), a current time and a maximum response standby time are set at step (6-2). Information about the request packet is registered with the hash buffer at step (6-3).

In this case, the information registered with the hash buffer may include a GTP version, a message type, GTP information (i.e., a TEID), a P-GW IP, an S-GW IP, and an assigned IP (i.e., an end-user IP).

If a packet is determined to be a response, first, whether a request has been registered with the hash buffer is determined at step (7-1). At step (7-2), the request is searched for based on a GTP version, a message type, a TEID, and gateway IP information.

If a request has not been registered with the hash buffer, the management of a session is terminated at step (7-3). If a request is determined to have been registered with the hash buffer, a response time set in the timer is checked at step (7-4). If the response time is determined to have been exceeded, the management of the session is terminated at step (7-5).

If the response is determined to have arrived within the response time, a command may be executed at step (7-6).

At step (8), the determination and execution of a GTP-C command are performed. At step (8-1), a session chain is created based on information about UE, given in response to the request, in response to a creation command.

At step (8-2), the session chain includes UE, an IP (i.e., an end-user IP), uplink control (UC), downlink control (DC), uplink data (UD), and downlink data (DD). The UC, DC, UD, and DD may have end-user IP information via a TEID and gateway IP information. The information about the UE connected to the IP address may be searched for.

At step (9), the information about the UE is searched for in order to execute a GTP-C command for modification or deletion. The information about the UE is required because the modification and deletion are tasks for updating and deleting an existing session for the UE. At step (9-1), the session chain is searched for IP information assigned to the UE based on information about the TEID of a GTP.

At step (9-2), the information about the UE is obtained by searching the session chain based on the IP information. At step (9-3), a session chain update (or modification) command is performed on the UE. The UE updates related information connected by a chain.

At step (10), the GTP-C command for deletion is executed. At step (10-1), a link connected to each data is removed from the session chain. At step (10-2), a memory space to which the session chain has been assigned is released.

The method of managing a session based on a GTP network according to the embodiment of the present invention has been described above.

An apparatus for managing a session based on a GTP network according to an embodiment of the present invention is described below.

Figure 6:
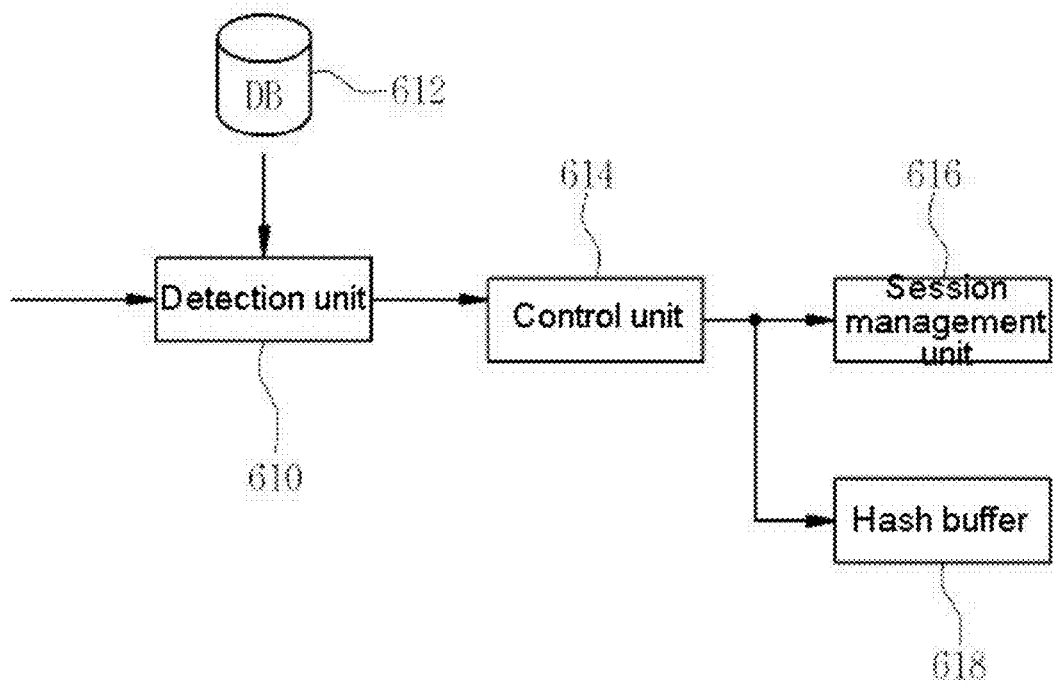
FIG. 6 is a detailed block diagram illustrating an apparatus for managing a session based on a GTP network according to an embodiment of the present invention.

FIG. 6 is a detailed block diagram illustrating the apparatus for managing a session based on a GTP network according to the present embodiment.

Referring to FIG. 6, the apparatus for managing a session based on a GTP network to which the present embodiment has been applied includes a predetermined management database (DB) 612, a detection unit 610, a control unit 614, a hash buffer 618, and a session management unit 616.

The detection unit 610 performs decoding on GTP packet data received through a GTP tunnel, and determines whether an attack attributable to malicious behavior has been made on the GTP packet data based on the predetermined management DB 612. The detection unit 610 determines the types of GTP packets with respect to GTP packet data on which an attack has been made and GTP packet data on which an attack has not been made based on a result of the determination. A predetermined policy for the determined type of GTP packet is carried out.

The control unit 614 sets up a session in response to a session setup request for a GPRS application service. Once the session has been created, the control unit 614 processes GTP packet data between the S-GW and the P-GW using a GTP tunnel created by monitoring the traffic of a tunnel creation request message.

The session management unit 616 creates a session chain based on a tunnel creation request packet and a tunnel creation response packet under the control of the control unit 614.

When the traffic of the tunnel creation request message transmitted from the S-GW to the P-GW is monitored in order to create the GTP tunnel, the control unit 614 extracts information about UE for the registration of a session from the tunnel creation request packet, and registers the extracted information with the hash buffer 618. When the tunnel creation response message is transmitted from the P-GW to the S-GW in response to the received tunnel creation request message, the GTP tunnel based on the information about the UE is created in response to the tunnel creation response message received from the S-GW.

Furthermore, the control unit 614 determines the message of a GTP-C packet received through the GTP tunnel. If the message is determined to be a tunnel modification or deletion message, the control unit 614 searches a session chain, corresponding to information about the TEID of the GTP-C packet, for an IP address assigned to the UE.

Furthermore, the control unit 614 performs control so that the session chain modification or deletion command corresponding to the information about the UE obtained from the session chain through the IP address is executed, and updates related information, connected to the information about the UE by a chain, in response to the executed session chain modification or deletion command.

In this case, in the session chain, uplink/downlink information is linked to the IP address assigned to the UE. The IP address is linked to the information about the UE. The UE is linked to the uplink/downlink information and the IP address.

Furthermore, the session chain is configured to include the value of the unique international mobile subscriber identity (IMSI) of the UE extracted from packet data, an IP assigned through a UE access procedure defined in a network from the P-GW, and the TEID assigned when the GTP tunnel is created. The session chain is created based on the information about the UE that is included in a packet for setting up a data call between the S-GW and the P-GW and that is given by the tunnel creation request message.

The session chain further includes an IP (i.e., an end-user IP), UC, DC, UD, and DD.

In this case, the UC, DC, UD, and DD obtains information about the end-user IP based on the TEID and information about a gateway IP. The UE corresponding to the end-user IP obtained when the session chain is searched for the information about the UE is searched for.

The control unit 614 recognizes the type of GTP packet received through the GTP tunnel, searches for the IP address using the TEID information included in the UC or DC information in accordance with a policy predetermined in the recognized GTP-C packet, and performs control so that information about the session chain linked to the UE.

Furthermore, the session management unit 616 determines the command of the message of a GTP-C packet received through the GTP tunnel. If the message of the GTP-C packet is a tunnel modification or deletion message, the session management unit 616 searches a session chain, corresponding to information about the TEID of the GTP-C packet, for IP information assigned to the UE, executes a session chain modification or deletion command corresponding to the information about the UE obtained from the session chain based on the IP information, and updates related information connected to the information about the UE by a chain in response to the executed session chain modification or deletion command.

Meanwhile, if the command of the message of the GTP-C packet is determined to be the tunnel deletion message, the session management unit 616 removes a link connected to each data of the session chain corresponding to the TEID information of the GTP-C packet, and releases an assigned memory space.

As described above, the present invention is advantageous in that a GTP session can be managed in a GTP network environment in the form of a single session.

As described above, the operations regarding the method and apparatus for managing a session based on a GTP network according to the embodiments of the present invention can be performed. Meanwhile, although the specific embodiments of the present invention have been disclosed for illustrative purposes, various modifications and variations can be made without departing from the scope and spirit of the invention. Accordingly, the scope of the present invention should be determined based on the claims and equivalents to the claims, rather than the above-described embodiments.

What is claimed is:

1. A method of managing a session based on a general packet radio service (GPRS) tunneling protocol (GTP) network, the method comprising:
   monitoring a message flow of a tunnel creation request message transmitted between a serving gateway (S-GW) and a PDN gateway (P-GW) in order to create a GTP tunnel;
   extracting information about user equipment (UE) for registration of a session from the tunnel creation request packet, and registering the extracted information with a hash buffer;
   monitoring, by the P-GW, a message flow of a tunnel creation response message transmitted to the S-GW in response to the received tunnel creation request message;
   creating the GTP tunnel based on the information about the UE in response to the tunnel creation response message received by the S-GW;
   creating a session chain based on a GTP packet transmitted through the created GTP tunnel; and
   performing decoding on GTP packet data received through the GTP tunnel, and determining whether there is an attack attributable to malicious behavior based on a predetermined management DB;
   blocking a GTP-C packet determined to be attacked as a result of the determination based on corresponding IP information, and obtaining the information about the UE for a GTP-U packet by searching a registered session chain for the information about the UE based on GTP packet information; and
   controlling a GTP-U packet determined to be not attacked as a result of the determination based on information about a policy of the GTP network, extracting predetermined information from a GTP-C packet, and generating the extracted information as the session chain.

2. The method of claim 1, wherein:
   the session chain is linked to an IP address at which uplink/downlink information is assigned to the UE;
   the IP address is linked to the information about the UE; and
   the UE is linked to the uplink/downlink information and the IP address.

3. The method of claim 1, further comprising:
   storing a tunnel modification request or a tunnel deletion request for updating or deleting a session in a hash buffer through the created GTP tunnel; and
   searching for an IP address by using information about a TEID of a GTP header if a response is made in response to the tunnel modification or deletion request, and searching for the UE based on the retrieved IP address.

4. The method of claim 3, wherein, when a command for the tunnel modification request is executed, a type of the GTP packet received through the GTP tunnel is recognized, the IP address is searched for by using the TEID information included in uplink control (UC) or downlink control (DC) information according to a policy predetermined in a recognized GTP-C packet, and information about the session chain linked to the UE is modified.

5. The method of claim 3, wherein, when a command for the tunnel deletion request is executed, a type of the GTP packet received through the GTP tunnel is recognized, the IP address is searched for using the TEID information included in UC or DC information according to a policy predetermined in a recognized GTP-C packet, the connection of the session chain linked to the UE is released, and memory is reorganized.

6. The method of claim 1, wherein, when a GTP-U packet is received, the P-GW inserts a GTP-U header having a TEID into the GTP-U packet, and sends the GTP-U packet through the GTP tunnel.

7. The method of claim 6, wherein the TEID is identified as a downlink TEID for a case where an inbound GTP packet is transmitted from the P-GW to the S-GW or an uplink TEID for a case where an outbound GTP packet is transmitted from the S-GW to the P-GW.

8. An apparatus for managing a session based on a general packet radio service (GPRS) tunneling protocol (GTP) network, the apparatus comprising:
   a session management system configured to monitor a tunnel creation request message transmitted between a serving gateway (S-GW) and a PDN gateway (P-GW) in order to create a GTP tunnel, to extract information about user equipment (UE) for registration of a session from the tunnel creation request packet, to register the extracted information with a hash buffer, and to create the GTP tunnel based on the information about the UE in response to a tunnel creation response message received by the S-GW when the tunnel creation response message is transmitted to the S-GW in response to the received tunnel creation request message and to form a session chain based on a GTP packet transmitted through the created GTP tunnel under a control of the control unit; and
   a detection system configured to perform decoding on GTP packet data received through the GTP tunnel, to determine whether there is an attack attributable to malicious behavior based on a predetermined management DB, to block a GTP-C packet determined to be attacked as a result of the determination based on corresponding IP information, to obtain the information about the UE for a GTP-U packet by searching a registered session chain for the information about the UE based on GTP packet information, to control a GTP-U packet determined to be not attacked as a result of the determination based on information about a policy of the GTP network, to extract predetermined information from a GTP-C packet, and to generate the extracted information as the session chain.

9. The apparatus of claim 8, wherein the session management system is configured to determine a command for a message of a GTP-C packet received through the GTP tunnel, to search a session chain, corresponding to information about a TEID of the GTP-C packet for an IP address assigned to the UE if the message of the GTP-C packet is a tunnel modification or deletion message, to perform control so that a session chain modification or deletion command corresponding to the information about the UE obtained from the session chain through the IP address is executed, and to update related information connected to the information about the UE by a chain in response to the executed session chain modification or deletion command.

10. The apparatus of claim 8, wherein:
   the session chain is linked to an IP address at which uplink/downlink information is assigned to the UE;
   the IP address is linked to the information about the UE; and
   the UE is linked to the uplink/downlink information and the IP address.

11. The apparatus of claim 8, wherein the session management system is configured to perform control so that a type of the GTP packet received through the GTP tunnel is recognized, an IP address is searched for by using TEID information included in uplink control (UC) or downlink control (DC) information in accordance with a policy predetermined in a recognized GTP-C packet, and information about the session chain linked to the UE is modified.

* * * * *